Aug. 13, 1963 L. E. HOLLANDER, JR 3,100,849
ACTIVE SOLID-STATE DEVICES USING ANISOTROPIC SINGLE CRYSTAL RUTILE
Filed June 29, 1960 3 Sheets-Sheet 1

INVENTOR.
LEWIS E. HOLLANDER, JR.
BY
George C. Sullivan
Agent

INVENTOR.
LEWIS E. HOLLANDER, JR.
BY
[signature]
Agent

INVENTOR.
LEWIS E. HOLLANDER, JR.
BY
George C. Sullivan
Agent

United States Patent Office 3,100,849
Patented Aug. 13, 1963

3,100,849
ACTIVE SOLID-STATE DEVICES USING ANISOTROPIC SINGLE CRYSTAL RUTILE

Lewis E. Hollander, Jr., Los Altos Hills, Calif., assignor to Lockheed Aircraft Corporation, Burbank, Calif.

Filed June 29, 1960, Ser. No. 39,584
15 Claims. (Cl. 307—88.5)

This invention relates generally to solid-state electronic devices, and more particularly to solid-state electronic devices employing single crystal rutile as the solid-state material.

The use of solid-state materials for making new types of electronic devices, such as diodes and transistors, has received considerable attention in recent years. One of the main limitations of presently known solid-state devices, however, is that they are limited to a specific temperature range of operation, beyond which they will not function satisfactorily. As a result, the use of presently known solid-state devices in military and space applications, where operating temperature range is a prime consideration, has been severely restricted.

Accordingly, one of the main objects of this invention is to provide new types of solid-state electronic devices which are operable over a wide temperature range, particularly at the very high temperatures.

Another object of this invention is to provide new types of solid-state electronic devices employing single crystal rutile as the solid-state material.

A further object of this invention is to provide solid-state modulation, amplification and computation devices employing single crystal rutile as the solid-state material.

The specific nature of the invention, as well as other objects, uses and advantages thereof, will clearly appear from the following description and the accompanying drawing in which:

FIG. 1 is a graph showing the anisotropic conduction ratio $\rho_a/\rho_c$ which has been discovered in single crystal rutile for the "$a$" and "$c$" crystal directions at temperatures of −20° centigrade, 23° centigrade and 50° centigrade.

FIGS. 2–4 are schematic diagrams of a microscopic element of single crystal rutile which will be used in explaining the theoretical operation of the invention. FIG. 2 is a schematic diagram of a microscopic element of single crystal rutile having relatively few oxygen vacancies therein; FIG. 3 is a schematic diagram of a microscopic element of single crystal rutile having sufficient oxygen vacancies so that the electron orbits just overlap in the "$c$" crystal direction; and FIG. 4 is a schematic diagram showing how the electron orbits of the single crystal rutile element of FIG. 2 are affected by the application of an electric field E in the "$a$" crystal direction.

Like numerals designate like elements throughout the figures of the drawing.

Rutile is one of three crystal modifications of titanium dioxide, $TiO_2$, the electrical properties of which are dependent on the amount of oxygen deficiency in the $TiO_2$ crystal lattice. For example, rutile may be varied from a good insulator ($10^{13}$ ohm-centimeter) in the stoichiometric state to a conductor (0.1 ohm-centimeter) by varying the oxygen deficiency in the crystal lattice. The rutile crystal structure is tetragonal, with $a$=4.4923 angstroms, $c$=2.8930 angstroms and the Schonflies symmetry $D_{4h}$. The symbols "$a$" and "$c$" are orientation axes of the crystal and, similar to the symmetry symbol "$D_{4h}$," will readily be understood by those skilled in the art.

The decomposition or reduction of rutile and the resultant semiconductive properties thereof have already been investigated in the art and are well-known. Also, rutile has been advantageously used in electric current rectifiers, and also, as the dielectric for capacitors (see Patents Nos. 2,692,212; 2,695,380 and 2,272,330). The use of rutile as a piezoresistive transducer is disclosed in my copending patent application, Serial No. 855,042, filed on November 24, 1959.

Figure 1:
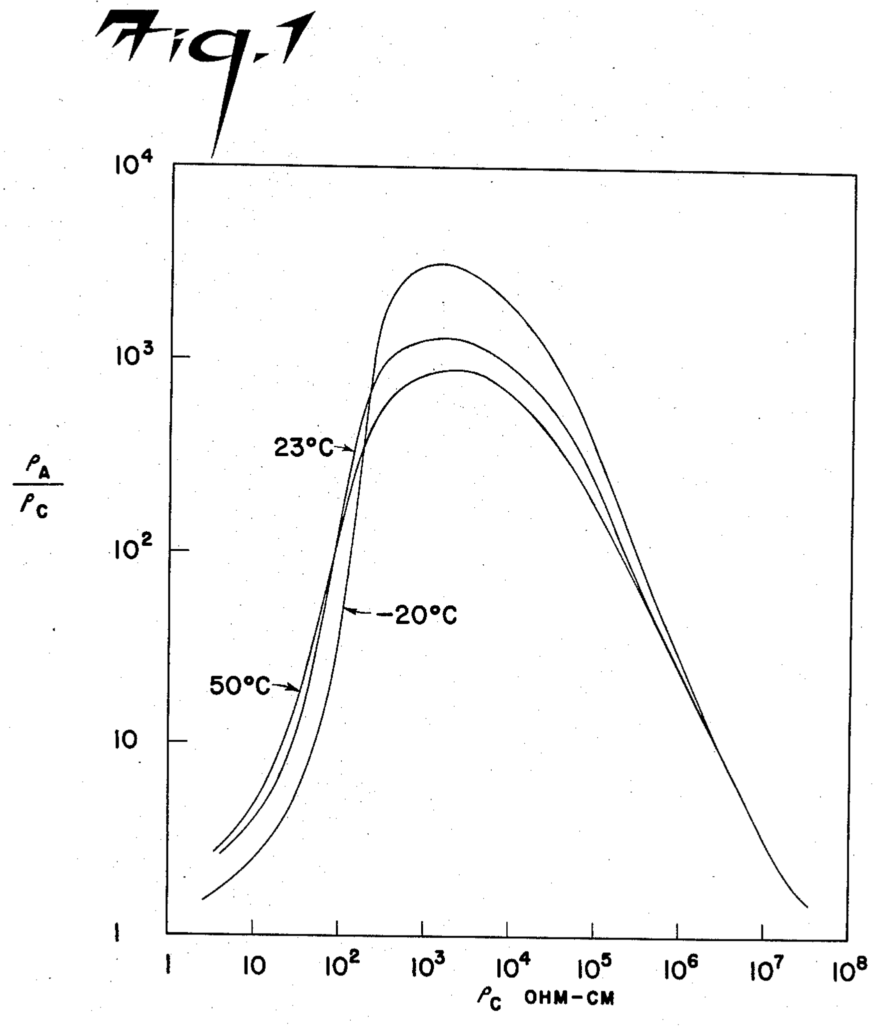

As a result of considerable research and investigation of the properties of rutile, I have discovered that for a predetermined range of oxygen vacancy densities in single crystal rutile, conduction in the "$a$" and "$c$" crystal directions is highly anisotropic; that is, the ratio of the resistivity $\rho_a$ in the "$a$" crystal direction to the resistivity $\rho_c$ in the "$c$" crystal direction is quite considerable and may be at least of the order of 2,000 to 1 over a very wide temperature range. It was found that the anisotropy in conduction is relatively small where the oxygen vacancy density is high corresponding to a "$c$" axis resistivity $\rho_c$ of $10^{-1}$ ohm-centimeter, but increases markedly as the density of vacancy sites is decreased, until an oxygen vacancy density corresponding to a resistivity $\rho_c$ of the order of $10^3$ ohm-centimeters is reached where the anisotropic effect appears to be a maximum. Beyond this maximum, the anisotropy decreases until it becomes relatively small at an oxygen vacancy density corresponding to a resistivity $\rho_c$ of $10^8$ ohm-centimeter. These results are illustrated in the graph of FIG. 1 which is a plot of the anisotropic ratio $\rho_a/\rho_c$ versus the "$c$" axis resistivity $\rho_c$ at temperatures of −20° centigrade, 23° centigrade and 50° centigrade. Since the resistivity of rutile is dependent upon its oxygen vacancy density, the resistivity $\rho_c$ in the graph of FIG. 1 is a measure of the oxygen vacancy density present.

The anisotropic effect shown in the graph of FIG. 1 is believed to be a result of the differences in the points of transition in the "$a$" and "$c$" crystal directions between the two types of conduction—impurity band conduction and band gap conduction—which appear to be possible in non-stoichiometric rutile. At low oxygen vacancy densities corresponding to a high resistivity $\rho_c$ of greater than $10^8$ ohm-centimeters, band gap conduction is the principal means of conduction in both the "$a$" and "$c$" crystal directions.

As the oxygen vacancy density increases, however, conduction in the "$c$" direction becomes predominantly impurity band conduction at a very much smaller vacancy density than in the "$a$" direction. For example, impurity band conduction predominates in the "$c$" direction where the resistivity $\rho_c$ is of the order of $10^3$ ohm-centimeters, but in the "$a$" direction significant impurity band conduction appears only for values of the resistivity $\rho_c$ of less than 1 ohm-centimeter. Since in rutile the conductivity for impurity band conduction is very much higher than for band gap conduction, the large anisotropic characteristic shown in the graph of FIG. 1 results.

The differences in transition between band gap conduction and impurity conduction in the "$a$" and "$c$" directions may be understood from consideration of the crystal lattice of rutile. The lattice spacing in the "c" direction is 0.6441 of the spacing in the "a" direction. Thus, for an electron trapped on a titanium ion resulting from an oxygen vacancy in a rutile crystal lattice, the electron orbit will be elliptical with a Bohr radius in the "c" direction of about 90 angstroms and only about 40 angstroms in the "a" direction. Since for impurity band conduction the electrons are never free, the electron orbits must overlap in order to have conduction. If a sufficient oxygen vacancy density exists so that the electron orbits just overlap in the "c" direction, they will still be spaced by a relatively large distance in the "a" direction, thereby giving rise to a very large anisotropy in conductivity.

Figure 2:
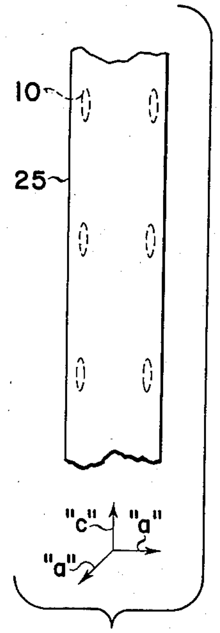
Figure 3:
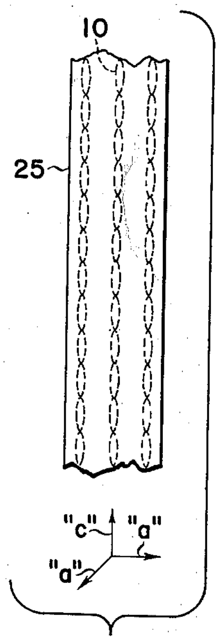
Figure 4:
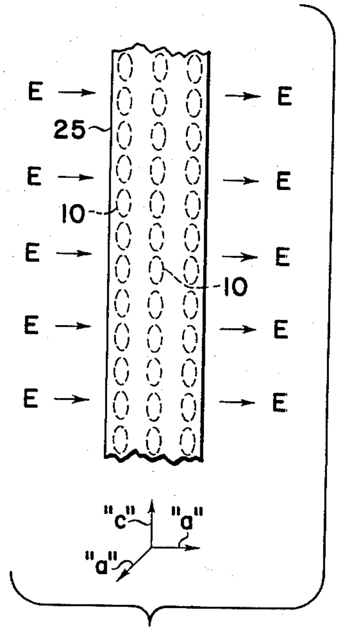

FIGS. 2–4 will now be used to present a physical picture of the anisotropic conduction phenomenon in single crystal rutile and indicate how it may be controlled by the application of an electric field E.

In FIG. 2 a portion of a microscopic element 25 of single crystal rutile having relatively few oxygen vacancies (such as would occur for a resistivity $\rho_c$ of greater than $10^8$) is indicated with its "c" and "a" axes oriented as shown. Typical electron orbits are indicated by the elliptical dashed lines 10. The elliptical orbits 10 are elongated in the "c" direction as explained previously. It can be seen that the orbits 10 are very far apart in both the "a" and "c" directions. Conduction is therefore of the band gap type and the anisotropic ratio $\rho_a/\rho_c$ is relatively small.

FIG. 3 shows the microscopic element of single crystal rutile with its oxygen vacancy sites increased to a sufficient density so that the elliptical orbits 10 just overlap in the "c" direction as shown. It will be noted that for this condition the orbits are still far from touching in the "a" direction. Since the electrons must overlap to permit any significant amount of conduction, the resistivity in the "a" direction where an appreciable spacing exists is very large as compared to the "c" direction where the orbits are just touching. For an oxygen vacancy density corresponding to a resistivity $\rho_c$ in the "c" direction of about $10^3$ ohm-centimeters, the ratio $\rho_a/\rho_c$ of the resistivities in the "a" and "c" directions is of the order of 2,000. A typical single-crystal rutile sample, therefore, might have a resistance of 1,000 ohms in the "c" direction and 2 megohms in the "a" direction.

FIG. 4 shows how the application of an electric field E to the microscopic single crystal rutile element 25 of FIG. 3 in the "a" direction affects the electron orbits 10. It is seen that the application of the electric field E causes the electron orbits 10 to be "bowed out" so that they are no longer overlapping in the "c" direction. Conduction will thus be drastically reduced in the "c" direction, but in the "a" direction only a negligible effect will occur because even when "bowed out" the orbits will still be relatively far apart. The application of the electric field E in the "a" direction is thus able to exert significant control over the conductivity in the "c" direction.

The particular condition shown in FIG. 3 where the oxygen vacancy density is such that the electron orbits are just touching in the "c" direction is the optimum situation which produces the greatest anisotropy and the maximum sensitivity of control. However, useable anisotropies and sensitivities are also obtained for other oxygen vacancy densities. Also, instead of using an applied field E, other means could be employed to perturb the orbits 10 in order to control the conductivity in the "c" direction, such as by the use of magnetic fields, acoustic vibrations or photon stimulation. The direction of application of the applied field E or the other perturbing means employed is not critical, the important requirement for control being the perturbing of the electron orbits 10 to an extent which will affect conductivity in the "c" direction.

Another effect which has been observed in single crystal rutile is that a significant anisotropy in dielectric constant is also present as well as the large anisotropy in conductivity discussed above. If the oxygen vacancy density is chosen so that the resistivity is sufficiently high in both the "a" and "c" directions to make the dielectric constants meaningful, it will be found that the dielectric constant in the "a" direction is about 80 and in the "c" direction about 180.

It has also been found that the application of an applied field E in various directions is able to exert a significant effect on the dielectric constants obtained in the "a" and "c" crystal directions. In particular, an applied field E in the "a" crystal direction produces a marked effect on the dielectric constant in the "c" direction.

Figure 5:
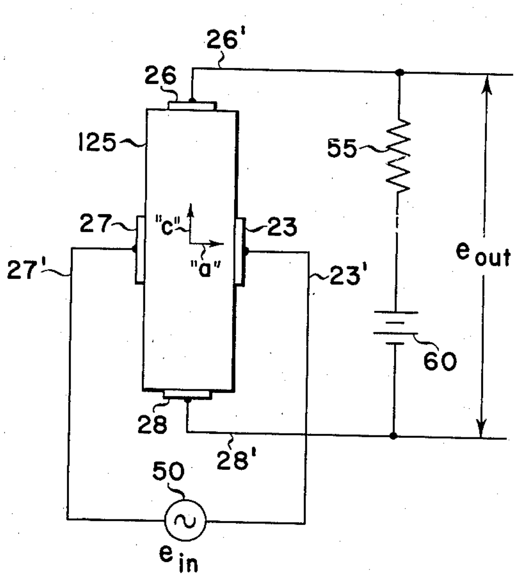
FIG. 5 is a schematic diagram of an embodiment of a solid-state amplifier and modulator employing single crystal rutile as the solid-state material in accordance with the invention.
Figure 6:
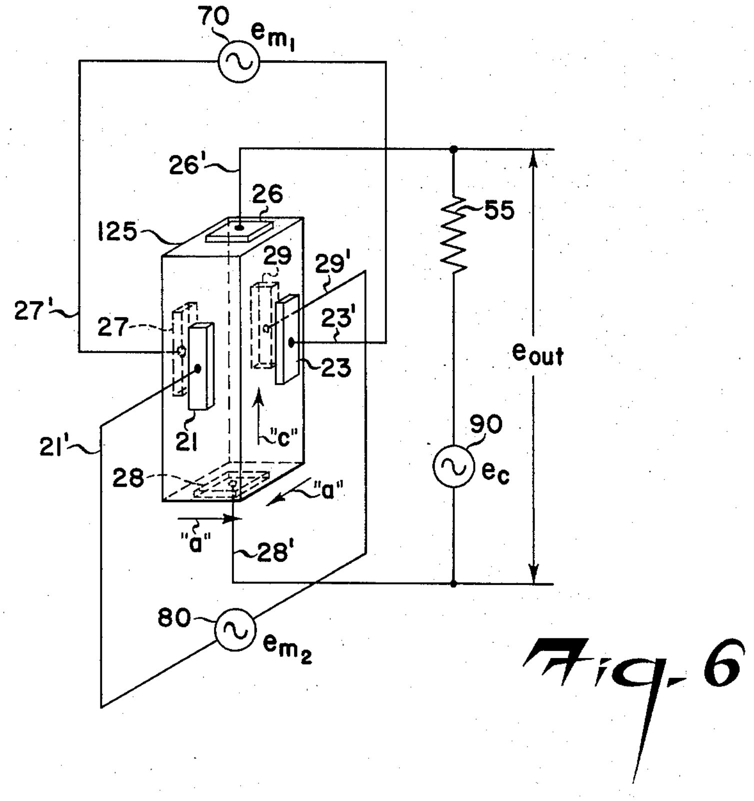
FIG. 6 is a perspective schematic diagram of an embodiment of a solid-state double modulation device employing single crystal rutile as the solid-state material in accordance with the invention.
Figure 7:
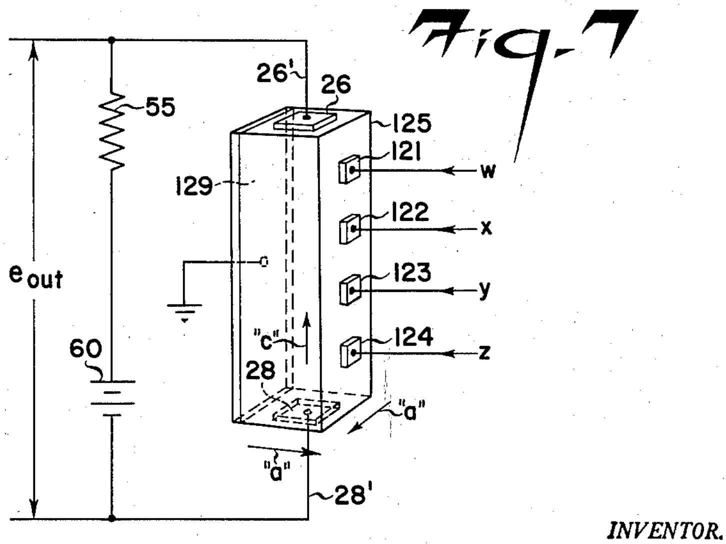
FIG. 7 is a perspective schematic diagram of an embodiment of a solid-state computer device employing single crystal rutile as the solid-state material in accordance with the invention.

Because of the new properties of rutile I have discovered and which are discussed above, it now becomes possible to devise new and improved types of electronic devices employing single crystal rutile as the solid-state material. Examples of such devices are illustrated in FIGS. 5–7. Because rutile is such a high temperature material (rutile melts at about 1800° centigrade), rutile solid-state devices are inherently operable up to very high temperatures.

In FIG. 5 a rectangular parallelepiped element 125 of single crystal rutile has "c" and "a" crystal axes oriented as shown, the longitudinal axis of the element 125 being parallel to the "c" direction and perpendicular to the "a" direction. The oxygen vacancy density of the rutile element 125 is chosen so that a large anisotropic conduction exists between the "a" and "c" axes. Ideally, an oxygen vacancy density corresponding to a "c" axis resistivity $\rho_c$ of the order of $10^3$ ohm-centimeters is preferable, since the maximum anisotropic effect occurs in this region. However, as shown in the graph of FIG. 1 an appreciable anisotropy is present over quite a large range so that the selection of the particular oxygen vacancy density is not critical.

In FIG. 5, two mutually perpendicular pairs of electrodes are now provided in contact with the single crystal rutile element 125. The electrodes 26 and 28 are on opposite faces of the element 125 so that current flow therebetween is substantially parallel to the "c" crystal direction, while the electrodes 23 and 27 are on opposite faces of the element 125 so that current flow therebetween is substantially parallel to an "a" crystal direction.

An input signal $e_{in}$ indicated by the generator 50 is connected between the "a" axis electrodes 23 and 27 by means of the lead wires 23' and 27', and a D.-C. voltage source 60 in series with a resistor 55 are connected between the "c" axis electrodes 26 and 28 by means of the lead wires 26' and 28'.

From the previous discussion regarding the electron orbits of single crystal rutile and the effect of an applied electric field thereon in the "a" direction, it will be understood that variations in the input signal $e_{in}$ will cause corresponding variations in the resistance appearing between the "c" axis electrodes 26 and 28. The voltage $e_{out}$ appearing across these electrodes 26 and 28 in the circuit of FIG. 5, therefore, will be a representation of the input signal $e_{in}$; and, because the input resistance appearing between the "a" axis electrodes 23 and 27 is very large as compared to the resistance across the "c" axis electrodes 26 and 28, it has been found that an appreciable power gain may be achieved. Preferably, the load resistor 55 should be large compared to the resistance appearing across the "c" axis electrodes 26 and 28.

If an A.-C. source were substituted for the D.-C. source 60 in FIG. 5, it will be realized that the output signal $e_{out}$ would then be the A.-C. source amplitude modulated by the input signal $e_{in}$. Thus, the device illustrated in FIG. 5 may also be advantageously employed for modulation purposes.

FIG. 6 is a perspective schematic diagram showing how an A.-C. signal $e_c$ indicated at 90 may be amplitude modulated by two signals $e_{m1}$ and $e_{m2}$ indicated at 70 and 80, respectively, in accordance with the invention. The single crystal rutile element 125 shown in FIG. 6 may be the same as that of FIG. 5 with the addition of the electrodes 21 and 29 on the remaining two opposite faces at substantially the same longitudinal location. It will be noted that two "$a$" directions are shown which exist because there are two "$a$" directions in the rutile crystal.

The A.-C. signal $e_c$ to be modulated is connected in series with the load resistor 55 across the "$c$" direction electrodes 26 and 28 by means of the lead wires 26′ and 28′. The first modulating signal $e_{m1}$ is connected across the "$a$" direction electrodes 27 and 23 by means of the lead wires 27′ and 23′, respectively, and the other modulating signal $e_{m2}$ is connected across the "$a$" direction electrodes 21 and 29 by means of the lead wires 21′ and 29′, respectively.

It will be understood that the resistance appearing between the "$c$" axis electrodes 26 and 28 will vary as a result of the cumulative effect of the applied electric fields in both "$a$" directions, the effects in the two "$a$" directions being additive because both pairs of "$a$" direction electrodes have substantially the same longitudinal location. The output voltage $e_{out}$ appearing across the "$c$" electrodes 26 and 28, therefore, will be the A.-C. signal $e_c$ amplitude modulated by the sum of the modulation signals $e_{m1}$ and $e_{m2}$.

If the A.-C. voltage source $e_c$ indicated at 90 in FIG. 6 were replaced by a D.-C. source, the modulation signals $e_{m1}$ and $e_{m2}$ would then both appear in the output signal $e_{out}$, and because of the large ratio of input resistance to output resistance, each will experience a significant power gain.

It will now be appreciated that by applying one input signal in each "$a$" direction as shown in FIG. 6, the effects of each are essentially added in the output without the need for causing significant interaction therebetween, because of the relatively high input resistances which are present in the "$a$" direction. Of course, as in any solid-state device, capacitive coupling between electrodes is a possibility at higher frequencies, but the techniques applied to known solid-state devices for reducing capacitative coupling effects can also be applied to single crystal rutile devices for the present invention.

FIG. 7 is a perspective schematic diagram illustrating how a solid-state computer device may be devised using single crystal rutile as the solid-state material. The rutile element 125 and the "$c$" direction electrodes may be the same as in FIGS. 5 and 6. However, the other electrodes are located differently. As shown in FIG. 7, small longitudinally spaced electrodes 121, 122, 123 and 124 are provided on one longitudinal face of the element 125 and on the opposite face is provided a grounded electrode 129. To each of the electrodes 121, 122, 123 and 124 is connected an input signal designated W, X, Y and Z, respectively. Connected between the "$c$" axis electrodes 26 and 28 are a D.-C. source 60 and a load resistor 55 in series which may be the same as in FIG. 5.

The single crystal rutile element 125 may now be considered as made up of four series connected segments, each segment corresponding to one of the electrodes 121, 122, 123 and 124. Considered in this manner it will be realized that the "$c$" direction resistance of each segment will vary in accordance with the particular input signal W, X, Y or Z applied to its electrode 121, 122, 123 or 124, respectively. Thus the output voltage $e_{out}$ obtained will be proportional to the product WXYZ of the input signals. For example, if all the input signals are the same—that is, equal to X—the output signal $e_{out}$ will be proportional to $X^4$.

Those skilled in the art will appreciate, therefore, that the newly discovered properties of single crystal rutile now make possible new, simple and compact computer devices which are capable of providing a wide variety of computer operations, such as multiplication, squaring, cubing, etc. In this connection, it will be evident that electrodes could also be provided on the unused faces of the element 125 in FIG. 7 so as to provide greater versatility. For example, a grounded electrode similar to 129 could be provided on one of the unused faces and one or more longitudinally spaced smaller electrodes could be provided on the opposite face.

Figure 8:
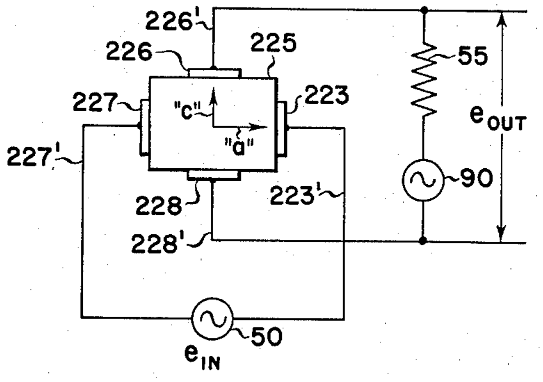
FIG. 8 is a schematic diagram of an embodiment of a dielectric amplifier employing single crystal rutile as the dielectric material in accordance with the invention.

It will be remembered from the previous discussion that the dielectric constant of single crystal rutile is also field dependent, particularly in regard to the dielectric constant in the "$c$" direction in response to a field applied in the "$a$" direction. It is possible, therefore, to devise single crystal rutile electronic devices whose operation is dependent upon capacitance variation effects as well as conductance variation effects as just described. Such a device is illustrated in FIG. 8 in which a single crystal rutile element 225 is oriented with "$a$" and "$c$" crystal axes as shown. The oxygen vacancy density in the element 225 is chosen to be relatively small (resistivity high) so that the element 225 has the characteristics of a low loss dielectric.

Electrodes 226 and 228 are provided on opposite faces of the element so as to be space opposed in a direction substantially parallel to the "$c$" crystal direction, while electrodes 223 and 227 are provided on opposite faces of the element 225 so as to be space opposed in a direction substantially parallel to an "$a$" crystal direction.

An input signal $e_{in}$ indicated by the generator 50 is connected between the "$a$" axis electrodes 223 and 227 by means of the lead wires 223′ and 227′, and an A.-C. source 90 in series with a load resistor 55 are connected between the "$c$" axis electrodes 226 and 228 by means of the lead wires 226′ and 228′.

The input signal $e_{in}$ applies an electric field parallel to the "$a$" axis of the element 255 which causes corresponding variations in the capacitance appearing across the "$c$" axis electrodes 226 and 228. An output voltage $e_{out}$ will therefore be obtained which is representative of the input signal $e_{in}$. Such a device as shown in FIG. 8 could be employed for modulation or amplification in a variety of ways which will occur to those skilled in the art. Also, additional electrodes could be employed on the unused faces of the element 225 to achieve greater versatility.

In providing single-crystal rutile elements for use in constructing electronic devices in accordance with the present invention, a variety of well known techniques could be used. For example, single-crystal rutile boules of stoichiometirc rutile could be X-ray oriented by the Laue back-reflection technique and then cut to form elements of a desired shape and size. After cleaning, these elements are placed in a quartz tube furnace and reduced (the term reduced refers to the introduction of oxygen vacancies in the crystal lattice) at 600° to 700° centigrade in a mixture of hydrogen and argon until the desired oxygen vacancy density is obtained, which can be determined from resistivity measurements. The particular oxygen vacancy density obtained may be controlled by controlling the reaction temperature, the hydrogen-argon mixture and the time of reduction.

The electrodes may be provided on the reduced single crystal rutile by any suitable means, such as by the use of metal evaporation or deposition techniques. The electrode lead wires are then suitably connected and the entire unit encapsulated if so desired.

It is to be understood in connection with this invention that the embodiments described and illustrated herein are only exemplary and many variations and modifications in the construction and arrangement are possible. For example, although a rectangular parallelepiped single-crystal rutile element is shown, it will be appreciated that many other shapes are possible. Also, the location of the electrodes on the element with respect to the crystal axes may have other possible arrangements. Furthermore, other means could be employed for making use of the newly discovered properties, such as the use of applied magnetic fields or other means for perturbing the electron orbits. The present invention, therefore, is to be considered as including all possible variations and modifications coming within the scope of the invention as defined in the appended claims.

I claim as my invention:

1. A solid-state electronic device having an element of single crystal rutile as the solid-state material, said element having an oxygen vacancy density chosen so that an anisotropy in conduction exists in at least two different mutually perpendicular directions in said element, and a plurality of electrodes disposed on said element in a predetermined arrangement.

2. An element of single crystal rutile having an oxygen vacancy chosen so that an anisotropy in conduction exists between "*a*" and "*c*" crystal directions in said element, a first pair of oppositely disposed electrodes provided on said element in a direction substantially parallel to the "*c*" crystal direction thereof, and a second pair of oppositely disposed electrodes provided on said element in a direction substantially parallel to an "*a*" crystal direction thereof.

3. The invention in accordance with claim 2, wherein said element is in the form of a rectangular parallelepiped having its longitudinal axis substantially parallel to the "*c*" crystal direction of said element.

4. An element of single crystal rutile having an oxygen vacancy chosen so that an anisotropy in conduction exists between "*a*" and "*c*" crystal directions in said element, a first pair of oppositely disposed electrodes provided on said element in a direction substantially parallel to the "*c*" crystal direction thereof, a second pair of oppositely disposed electrodes provided on said element in a direction substantially parallel to one "*a*" crystal direction thereof, and a third pair of oppositely disposed electrodes provided on said element in a direction substantially parallel to the other "*a*" crystal direction thereof.

5. A solid-state electronic device comprising an element of single crystal rutile having an oxygen vacancy density chosen so that an anisotropy in conduction exists in at least two different mutually perpendicular directions in said element, means adapted to act on said element so as to perturb the conduction in said element in a predetermined direction, and means connected to said element for obtaining an electrical signal corresponding to the perturbance in conductance occurring in said element in said predetermined direction.

6. A solid-state electronic device comprising an element of single crystal rutile having an oxygen vacancy density chosen so that an anisotropy in conduction exists between "*a*" and "*c*" crystal directions in said element, a pair of oppositely disposed electrodes provided on said element in a direction substantially parallel to the "*c*" crystal direction thereof, means adapted to act on said element so as to perturb the conduction in said element in the "*c*" crystal direction in accordance with an input signal, and circuit means connected between said electrodes for obtaining an output signal corresponding to the perturbance in conductance occurring in said element in the "*c*" direction.

7. The invention in accordance with claim 6, wherein said first mentioned means comprises means for applying an electric field to said element parallel to an "*a*" crystal direction thereof, said electric field varying in accordance with said input signal.

8. A solid-state electronic device comprising an element of single crystal rutile having an oxygen vacancy density chosen so that an anisotropy in conduction exists between "*a*" and "*c*" crystal directions in said element, a first pair of oppositely disposed electrodes provided on said element in a direction substantially parallel to the "*c*" crystal direction thereof, a second pair of oppositely disposed electrodes provided on said element in a direction substantially parallel to an "*a*" crystal direction thereof, means applying an input signal between said second pair of electrodes, and circuit means connected between said first pair of electrodes for obtaining an output signal corresponding to the variation in resistance therebetween.

9. A solid-state electronic device comprising an element of single crystal rutile having an oxygen vacancy density chosen so that an anisotropy in conduction exists between "*a*" and "*c*" crystal directions in said element, a first pair of oppositely disposed electrodes provided on said element in a direction substantially parallel to the "*c*" crystal direction thereof, a second pair of oppositely disposed electrodes provided on said element in a direction substantially parallel to one "*a*" crystal direction thereof, a third pair of oppositely disposed electrodes provided on said element in a direction substantially parallel to the other "*a*" crystal direction thereof, means applying a first input signal between said second pair of electrodes, means applying a second input signal between said third pair of electrodes, and circuit means connected between said first pair of electrodes for obtaining an output signal corresponding to the variation in resistance therebetween.

10. The invention in accordance with claim 9, wherein said second and third pairs of electrodes are disposed so as to be at substantially the same location with regard to the "*c*" crystal direction.

11. An element of single crystal rutile having a longitudinal axis substantially parallel to the "*c*" crystal direction thereof, said element having an oxygen vacancy density chosen so that an anisotropy in conduction exists between "*a*" and "*c*" crystal directions in said element, a pair of oppositely disposed electrodes provided on said element in a direction substantially parallel to the "*c*" crystal direction thereof, and a plurality of electrodes provided on said element spaced along the longitudinal axis thereof.

12. The invention in accordance with claim 11 wherein said element is in the form of a rectangular parallelepiped and one of the longitudinal faces thereof has a longitudinal electrode extending substantially the length thereof, and said plurality of electrodes are longitudinally spaced on the opposite face from said longitudinal electrode.

13. A solid-state electronic computer device comprising an element of single crystal rutile having an oxygen vacancy density chosen so that an anisotropy in conduction exists between "*a*" and "*c*" crystal directions in said element, a pair of oppositely disposed electrodes provided on said element in a direction substantially parallel to the "*c*" direction thereof, a plurality of electrodes provided on said element spaced along the "*c*" crystal direction thereof, means applying input signals to said plurality of electrodes, and circuit means connected to said pair of oppositely disposed electrodes for obtaining an output signal corresponding to the variation in the resistance therebetween.

14. A solid-state electronic device comprising an element of single crystal rutile having an oxygen vacancy density such that the element acts as a capacitative dielectric, a pair of oppositely disposed electrodes on said element in a direction substantially parallel to the "*c*" direction thereof, means applying an electric field to said element so that the dielectric constant appearing between said electrodes is perturbed, and circuit means connected between said electrodes for obtaining an output signal corresponding to the variation in the capacitance therebetween.

15. A solid-state electronic device comprising an element of single crystal rutile having an oxygen vacancy density such that the element acts as a capacitative dielectric, a first pair of oppositely disposed electrodes provided on said element in a direction substantially parallel to the "*c*" crystal direction thereof, a second pair of oppositely disposed electrodes provided on said element in a direction substantially parallel to the "*a*" axis thereof, means applying an input signal to said second pair of electrodes, and circuit means connected to said first pair of electrodes for obtaining an output signal corresponding to the variation in the capacitance therebetween.

References Cited in the file of this patent

UNITED STATES PATENTS 2,940,941 Dalton ---------------- June 14, 1960

2,960,642 De Rudnay ------------ Nov. 15, 1960

OTHER REFERENCES

Berberick and Bell, "Dielectric Properties of the Rutile Form of $TiO_2$," Journal of Applied Physics, vol. 11, October 1940, pp. 681–692 (page 686 relied on).

Terman: Radio Engineering, McGraw-Hill, N.Y., 1947, pp. 552–553 relied on.